United States Patent [19]
Boly et al.

[11] Patent Number: 5,278,906
[45] Date of Patent: Jan. 11, 1994

[54] SYSTEM FOR ENCODING DATA PRESENTED WITH A FIRST CODING DEVICE AND FOR DECODING ENCODED DATA WITH A SECOND CODING DEVICE, AND CODING DEVICE FOR USE IN THE SYSTEM

[75] Inventors: Jean P. Boly, Zoeterwoude; Martin K. De Lange, Voorburg; Gerrit Roelofsen, Gouda; Gerrit J. Van Loo, Delft, all of Netherlands

[73] Assignee: Koninklijke Pit Nederland N.V., AC Groningen, Netherlands

[21] Appl. No.: 989,233

[22] Filed: Dec. 11, 1992

[30] Foreign Application Priority Data

Dec. 20, 1991 [NL] Netherlands ............... 9102157

[51] Int. Cl.$^5$ ............................................. H04K 1/00
[52] U.S. Cl. ................................. 380/48; 380/50; 380/43
[58] Field of Search ............... 380/20, 21, 43, 44, 380/46, 48, 49, 50

[56] References Cited

U.S. PATENT DOCUMENTS

| | | | |
|---|---|---|---|
| 4,663,500 | 5/1987 | Okamoto et al. | 380/48 X |
| 4,856,063 | 8/1989 | McCalmont | 380/48 |
| 4,972,481 | 11/1990 | Santesson | 380/49 |
| 5,060,266 | 10/1991 | Dent | 380/49 |

FOREIGN PATENT DOCUMENTS

| | | |
|---|---|---|
| 0232043A3 | 8/1987 | European Pat. Off. . |
| 3423400A1 | 9/1984 | Fed. Rep. of Germany . |
| 92005647A | 4/1992 | PCT Int'l Appl. ............ 380/48 |
| 1155456 | 6/1969 | United Kingdom . |

OTHER PUBLICATIONS

H. Muller, "Bit Sequence Independence Through Scramblers in Digital Communication Systems", Dec., 1974, pp. 475-479, NTZ Nachrichtechnische Zeitschrift.

*Primary Examiner*—Tod R. Swann
*Attorney, Agent, or Firm*—Frishauf, Holtz, Goodman & Woodward

[57] ABSTRACT

In a system for de-/encoding data using (de)coding devices at either end of a transmission channel, the data sometimes comprise additional synchronisation information which is used to reduce the effect of faults in the transmission channel. If this synchronisation information is not already present, it is impossible in certain cases to add such information. The invention provides a system which, regardless of the presence of additional synchronisation information, is able to reduce the effect of faults. For this purpose, each (de)coding device is provided with means for comparing sequences of encoded data with at least one predetermined code word and for setting the associated coding device to a reset state in the event of equality. Because the predetermined code word repeats statistically in the encoded data, a fault adversely affects the decoding for not more than one time interval.

6 Claims, 1 Drawing Sheet

SYSTEM FOR ENCODING DATA PRESENTED WITH A FIRST CODING DEVICE AND FOR DECODING ENCODED DATA WITH A SECOND CODING DEVICE, AND CODING DEVICE FOR USE IN THE SYSTEM

BACKGROUND OF THE INVENTION

The invention relates to a system for encoding data presented at one end of a transmission channel with a first coding device and for decoding the data encoded by the first coding device at the other end of the transmission channel with a second coding device.

Such a system is disclosed by EP 0 232 043 A2. This known system comprises a scrambler (the first coding device) at one end of the transmission channel for encoding incoming data (the data presented) and a descrambler (the second coding device) at the other end of the transmission channel for decoding the data encoded by the scrambler and for generating outgoing data. Said incoming data comprises words synchronously multiplexed in the frames. To indicate the frame timing, some of these words are so-called synchronisation words which must not be encoded. For this purpose, the scrambler comprises a frame-finding circuit which detects the synchronisation words in the incoming data and which, if a synchronisation word is detected generates a signal in response to which the detected synchronisation word is not encoded. At the same time, the descrambler also comprises a frame-finding circuit which detects the synchronisation words in the outgoing data and which, if a synchronisation word is detected, generates a signal in response to which the detected synchronisation word is not decoded. The descrambler furthermore comprises shift registers which, if the descrambler is unable to synchronise with the frames as a consequence of a fault in the transmission channel, alters the phase of the encoded data until the descrambler is again in a state which is synchronised with the frames. The effect of faults in the transmission channel on the system is reduced by using said shift registers.

Such a system has the disadvantage that the incoming data has to contain, or has to obtain, synchronisation information (the synchronisation words) since the descrambler is unable to get back to the state which is synchronized with the frames after getting out of synchronisation with the frames, and faults in the transmission channel can have a long-lasting disadvantageous effect on the decoding.

SUMMARY OF THE INVENTION

The object of the invention is, inter alia, to provide a system of the type mentioned in the introduction which, regardless of the possible presence of synchronisation information in the data presented, is able to reduce the effect of faults in the transmission channel.

For this purpose, the system according to the invention has the characteristic that the coding devices are each provided with comparison means coupled to the transmission channel for comparing sequences of encoded data with at least one predetermined code word and setting the associated coding device to a reset state in the event of equality.

The invention is based on the insight that, measured over a fairly long time, each word in the encoded data occurs equally often in the transmission channel and that one predetermined word is therefore statistically repeated after a certain time interval, the length of set time interval being dependent on the length of the predetermined word and the speed of the data presented. Comparison of sequences of encoded data both at the transmission end (at the first coding device) and at the receiving end (at the second coding device) with a predetermined code word and, in the event of equality, resetting the associated coding apparatus achieves the result that, statistically speaking, both coding devices are reset, or identically set, in each time interval. If a serious fault, such as the loss of one or more bits, occurs in the transmission channel, the first coding device will be reset in the associated time interval and the second coding device will not, as a result of which an incorrect decoding takes place, both coding devices being reset in the time interval subsequent thereto, as a result of which a correct decoding again occurs. In this system according to the invention, without additional synchronisation information being present in the data presented, the effect of a fault in the transmission channel lasts statistically not more than one time interval, and with a correct choice of the length of the predetermined code word, this generally results in an adequate reduction of the effect of a fault.

In a first embodiment, the system according to the invention has the characteristic that the coding devices are each provided with generator means comprising a reset input coupled to the comparison means.

Providing each of the coding devices with generator means such as, for example, pseudo-random generators which run mutually synchronously and which generate, in response to a signal which is present at their reset input and originates from the comparison means, each generate the same output signal, which may be arbitrarily chosen, achieves the result that the coding devices are set to the reset state in the event of equality of a sequence of coded data and the predetermined code word.

In a second embodiment, the system according to the invention has the characteristic that the generator means are each provided with an adjustment input, which is coupled to the transmission channel, for adjusting the reset state as a function of the encoded data.

In this case, the generator means can be set to various reset states, as a result of which the encoded data becomes more difficult for third parties to track. The reset state to which the generator means are set depends on the adjustment word which is present at the adjustment input and is derived from the encoded data.

In a third embodiment, the system according to the invention has the characteristic that the coding devices are each provided with combining means comprising a connection coupled to the transmission channel and an input coupled to an output of the generator means, the comparison means being coupled via shift means to the connection in order to receive the sequences of encoded data.

The data presented is encoded using the combining means associated with the first coding device by combining said data presented with the output signal of the associated generating means. The encoded data are decoded using the combining means associated with the second coding device by combining said encoded data with the output signal of the associated generator means. Such combining means may be formed, for example, by an EXOR gate. Sequences of encoded data are stored by means of the shift means such as, for example, shift registers in order to be compared later with the predetermined code word by the comparison means such as, for example, comparators.

In a fourth embodiment, the system according to the invention has the characteristic that the coding devices are each provided with further shift means in order to couple the adjustment input to the connection.

In this case, the adjustment word present at the adjustment input is formed by a sequence of encoded data which precedes or follows and/or completely or partly coincides with the sequence of encoded data which is compared with the predetermined code word. If the adjustment word coincides completely, it should of course be longer than the predetermined code word since there is otherwise only one possible reset state.

The invention also relates to a coding device for use in the system according to the invention.

Such a coding device has the characteristic that it is provided with comparison means, which can be coupled to the transmission channel, for comparing sequences of coded data with at least one predetermined code word and for resetting the coding device to a reset state in the event of equality.

In a first embodiment, the coding device according to the invention has the characteristic that it is provided with generator means comprising a reset input coupled to the comparison means.

In a second embodiment, the coding device according to the invention has the characteristic that the generator means are provided with an adjustment input, which can be coupled to the transmission channel, for adjusting the reset state as a function of the encoded data.

In a third embodiment, the coding device according to the invention has the characteristic that it is provided with combining means comprising a connection which can be coupled to the transmission channel and comprising an input coupled to an output of the generator means, the comparison means being coupled via shift means to the connection in order to receive the sequences of encoded data.

In a fourth embodiment, the coding device according to the invention has the characteristic that it is provided with further shift means for coupling the adjustment input to the connection.

In a fifth embodiment, the coding device according to the invention has the characteristic that the connection is an output of the combining means, which comprise a further input for receiving the data presented and to be encoded.

Said coding device codes the data presented and therefore has an encoding function. At the same time, the comparison means and the shift means are situated on the output side of the device.

In a sixth embodiment, the coding device according to the invention has the characteristic that the connection is a further input of the combining means, which comprise an output for generating decoded data.

Said coding device decodes the data presented and therefore has a decoding function. At the same time, the comparison means and the shift means are situated on the input side of the device.

REFERENCE

EP 0 232 043 A2.

EXEMPLARY EMBODIMENT

The invention will be explained in greater detail by reference to an exemplary embodiment shown in the Figure, in which:

DETAIL DESCRIPTION

Figure 1:
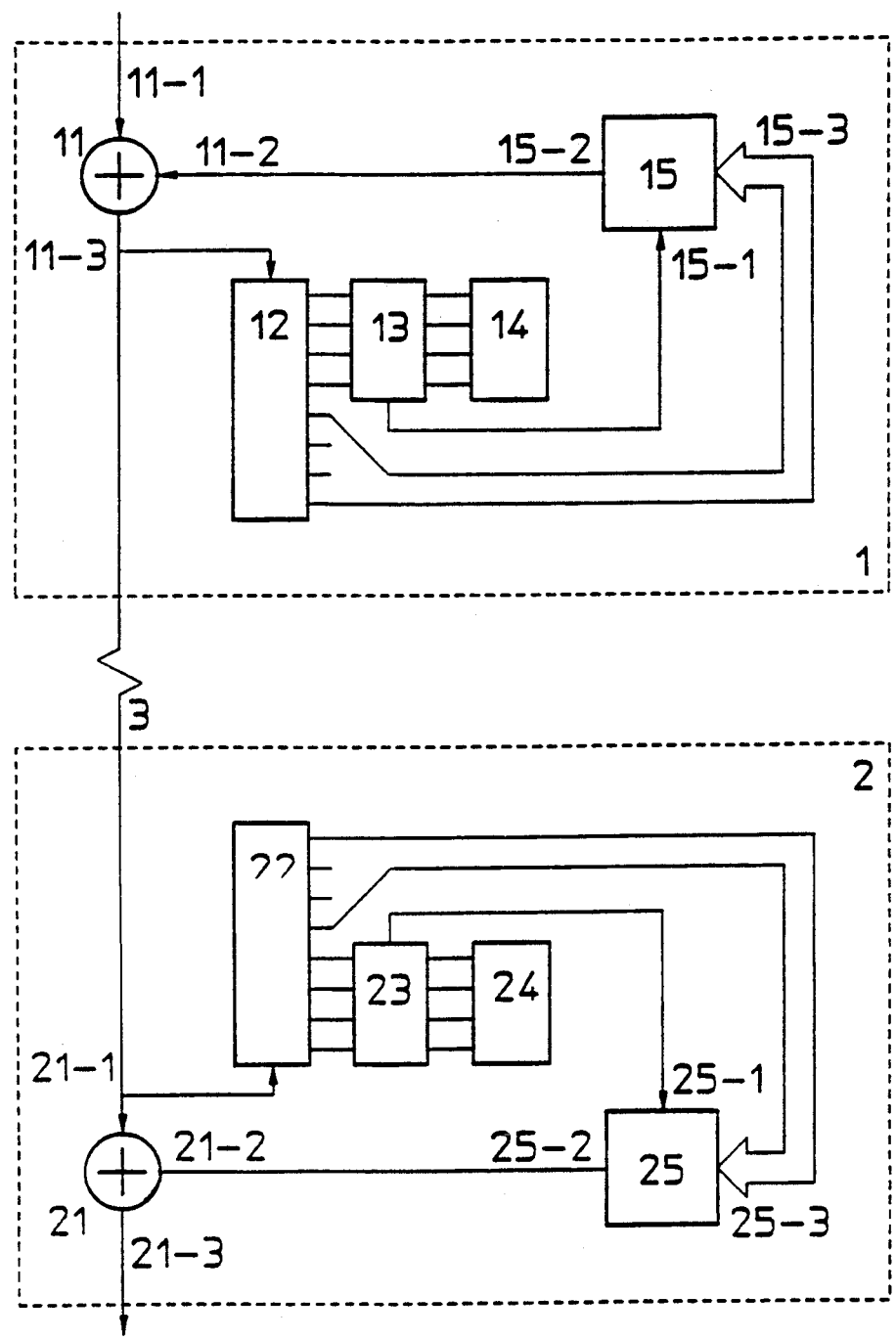
FIG. 1 shows an embodiment of the system according to the invention.

The system shown in FIG. 1 comprises a first coding device 1 and a second coding device 2 which are interconnected via a transmission channel 3. The coding device 1 has combining means 11 which are constructed as an EXOR gate, having an input 11-1 for receiving the data presented and to be encoded and having an input 11-2 connected to an output 15-2 of generator means 15 for receiving an output signal from the generator means 15, which is constructed as pseudo-random generator. EXOR gate 11 furthermore has an output 11-3 which forms a connection, connected to the transmission channel 3, for generating encoded data and which is connected to an input of shift means 12. A first output of shift means 12 and an output of a memory 14 are each connected to an input of comparison means 13 for comparing a sequence of encoded data present in the shift means 12 with a predetermined code word stored in memory 14. An output of comparison means 13 is connected to a reset input 15-1 of generator 15 for setting coding device 1 to a reset state in the event of equality. A second output of shift means 12 is connected to an adjustment input 15-3 of generator means 15 for adjusting the reset state. In this connection, shift means 12 can be formed by a shift register and comparison means 13 can be formed by parallel comparators whose outputs are fed to an AND gate.

The coding device 2 has combining means 21 which is constructed as an EXOR gate, which has an input 21-1 forming a connection connected to the transmission channel 3 for receiving encoded data to be decoded and connected to an input of shift means 22, and which has an input 21-2 connected to an output 25-2 of generator means 25 for receiving an output signal from the generator means 25, which are constructed as a pseudo-random generator. EXOR gate 21 furthermore has an output 21-3 for generating decoded data. A first output of shift means 22 and an output of a memory 24 are each connected to an input of comparison means 23 for comparing a sequence of encoded data present in shift means 22 with a predetermined code word stored in memory 24. An output of comparison means 23 is connected to a reset input 25-1 of generator 25 for setting coding device 2 to a reset state in the event of equality. A second output of shift means 22 is connected to an adjustment input 25-3 of generator means 25 for adjusting the reset state. In this connection, shift means 22 may be formed by a shift register, and comparison means 23 may be formed by parallel comparators whose outputs are fed to an AND gate.

The operation of the system shown in FIG. 1 is as follows. The data to be encoded is presented to input 11-1, and the data encoded with the aid of generator 15 appears at output 11-3. Said encoded data is then transmitted via transmission channel 3 and presented to input 21-1, and the data decoded with the aid of generator 25 appears at output 21-3. For encoding and decoding, respectively, it is necessary for the generators 15 and 25, whose output signal modulo two is added to the data presented and the encoded data respectively, to run synchronously. This can be achieved by synchronising both generators 15, 25 via phase-locked loops, which are not shown in the Figure, with signal transitions in the data, or by installing, for example, an additional connection between the generators 15 and 25. As long as the generators 15 and 25 run synchronously, the output signal of generator 15 is added in the coding device to the data presented modulo two and the same output signal, now originating, however, from generator 25 is added in the coding device 2 to the coded data modulo two, the original data presented thereby being obtained if no error has occurred in the transmission channel.

The resetting of the generator 15 by comparison means 13 and the resetting of generator 25 by comparison means 23 if a sequence of encoded data present at the first output of the shift means 12 and 22 corresponds to the code word stored in memories 14 and 24 is in fact superfluous as long as no fault occurs. The time interval in which one reset occurs statistically per generator is determined by the presented-data rate and the length of the code word. Statistically, for a presented-data rate of 10 Mbit/s and a word length of the code word of 20 bits, resets will occur every 0.1 seconds (2exp20≈1 million). Statistically, for a rate of 100 Mbit/s and a word length of 30 bits, resets will take place every 10 seconds (2exp30≈1 thousand million).

If the adjustment words which are present at the two outputs of the shift means 12 and 22 and determine the reset state are disregarded, the following four conceivable situations are possible if a fault occurs in the transmission channel:

A bit reversal occurs, as a result of which generator 25 is erroneously not reset (however, generator 15 is reset in this case) or is erroneously reset (generator 15 is not reset in this case). In both cases generators 15 and 25 are out of synchronisation, and an incorrect decoding takes place until both generators 15 and 25 are reset again after, statistically, one time interval.

A bit reversal occurs which does not have any consequences for the resetting of generator 25. In this case, only this bit is incorrectly reproduced in the decoded data, and this can be eliminated by means of error-detecting or error-correcting codes.

A bit loss or a bit gain occurs in a sequence of encoded data which originally corresponded to the code word. In this case, generator 25 is erroneously not reset, and an incorrect decoding therefore takes place until both generators 15 and 25 are reset again after, statistically, one time interval.

A bit loss or a bit gain occurs in another sequence of encoded data, which sequence does not correspond to the code word. In this case, the position of this other sequence with respect to the sequence corresponding to the code word is of importance. If the other sequence occurs in time just before the sequence corresponding to the code word, the incorrect decoding only takes place for a very short time. If the other sequence takes place in time just after the sequence corresponding to the code word, the incorrect decoding takes place until both generators are again reset after, statistically, one time interval. On average, incorrect decoding will take place for, statistically, one half time interval in this fourth case, until both the generators 15 and 25 are reset again.

In all four of the conceivable situations, an error therefore results in the incorrect decoding of the encoded data for not more than one statistical time interval. Some telecommunication recommendations require the exact knowledge of the length of this time interval. The system according to the invention can only specify this length statistically, it being possible, of course, to reduce said length statistically by shortening the length of the code word. On the other hand, a very great advantage is the simplicity of the system according to the invention and the reduction of the effect of faults in the transmission channel without additional synchronisation information having to be added, which addition is in practice often impossible as a consequence of the transmission channel already being "full".

If a bit reversal occurs in the sequence of encoded data forming the adjustment word, this only results in incorrect decoding during one time interval if a reset takes place at the same time and both generators 15 and 25 are therefore set to different reset states. If a bit loss or a bit gain occurs in the last-mentioned sequence, the above-mentioned fourth case applies.

In the embodiment shown in the Figure, the first output of the shift means 12 and 22 is connected to comparison means 13 and 23. In this case, a first sequence of encoded data is compared with the code word and the sequence immediately subsequent thereto forms the adjustment word which determines the reset state. Of course, it is also possible to interchange the connections of the two outputs of shift means 12 and 22, as a result of which the first sequence forms the adjustment word and the sequence immediately subsequent thereto is compared with the code word. Furthermore, both outputs of shift means 12 and 21 could also be connected to generator means 15 and 25, two subsequent sequences forming the adjustment word together, separate shift means could be used which, for example, have sequences, delayed in time, of encoded data for transmitting the adjustment word and said separate shift means could permit a certain series of encoded data to act as adjustment word by means of a further encoding by completely or partly feeding back via EXOR gates.

Of course, a scrambler and a descrambler and/or a convertor and a deconvertor can furthermore be added between coding device 1 and coding device 2, the combining means, which are constructed as an EXOR gate 11, 21 can also be formed in a different way (for example with an EXNOR gate, an ADDER etc.) and the generator means, which are constructed as a pseudorandom generator 15, 25, can also be formed as, for example, a generator which generates a very long sequence.

The time interval for which the incorrect decoding takes place can be reduced further by comparing the sequences of encoded data with more than one code word. Compared with shortening the length of the code word, this has the advantage that the time interval can then be reduced by any desired factor. If sequences of encoded data are compared, for example, with three code words instead of with one, the time interval is reduced by a factor of three, whereas only factors which are a power of two can be obtained by shortening the length of the code word.

We claim:

1. System for enclonding data presented at one end of a transmission channel with a first coding device and for decoding the data encoded by the first coding device at the other end of the transmission channel with a second coding device, the first and second coding devices being provided with comparison means coupled to the transmission channel for comparing sequences of encoded data with at least one predetermined code word and respectively setting the said second and first coding devices to a reset state in the event of equality, the coding devices each being provided with generator means comprising a reset input coupled to the comparison means, characterized in that the coding devices are each provided with combining means comprising a connection coupled to the transmission channel and an input coupled to an output of the generator means, the comparison means being coupled via shift means to said connection in order to receive the sequences of encoded data.

2. System according to claim 1, characterized in that the generator means are each provided with an adjustment input, which is coupled to the transmission channel, for adjusting the reset state as a function of the encoded data, the coding devices each being provided with further shift means in order to couple the adjustment input to said connection of said combining means.

3. Coding device for use in a system for encoding data presented at one end of a transmission channel and for decoding encoded data at an other end of the transmission channel, the coding device being provided with comparison means, which can be coupled to the transmission channel, for comparing sequences of encoded data with at least one predetermined code word and for resetting the coding device to a reset state in the event of equality, and the coding device being provided with generator means comprising a reset input coupled to the comparison means, characterized in that the coding device is provided with combining means comprising a connection which can be coupled to the transmission channel and comprising an input coupled to an output of the generator means, the comparison means being coupled via shift means to said connection in order to receive the sequences of encoded data.

4. Coding device according to claim 3, characterized in that the generator means are provided with an adjustment input which can be coupled to the transmission channel for adjusting the reset state as a function of the encoded data, the coding device being provided with further shift means for coupling the adjustment input to said connection.

5. Coding device according to claim 4, characterized in that said connection in said combining means is provided by an output of the combining means, which comprise a further input for receiving the data presented and to be encoded.

6. Coding device according to claim 4, characterized in that said connection in said combining means is provided by a further input of the combining means, which comprise an output for generating the decoded data.

* * * * *